March 20, 1962 L. A. KURTZ 3,026,513
DUAL BEAM TRACKING SYSTEM
Filed April 24, 1956 3 Sheets-Sheet 1
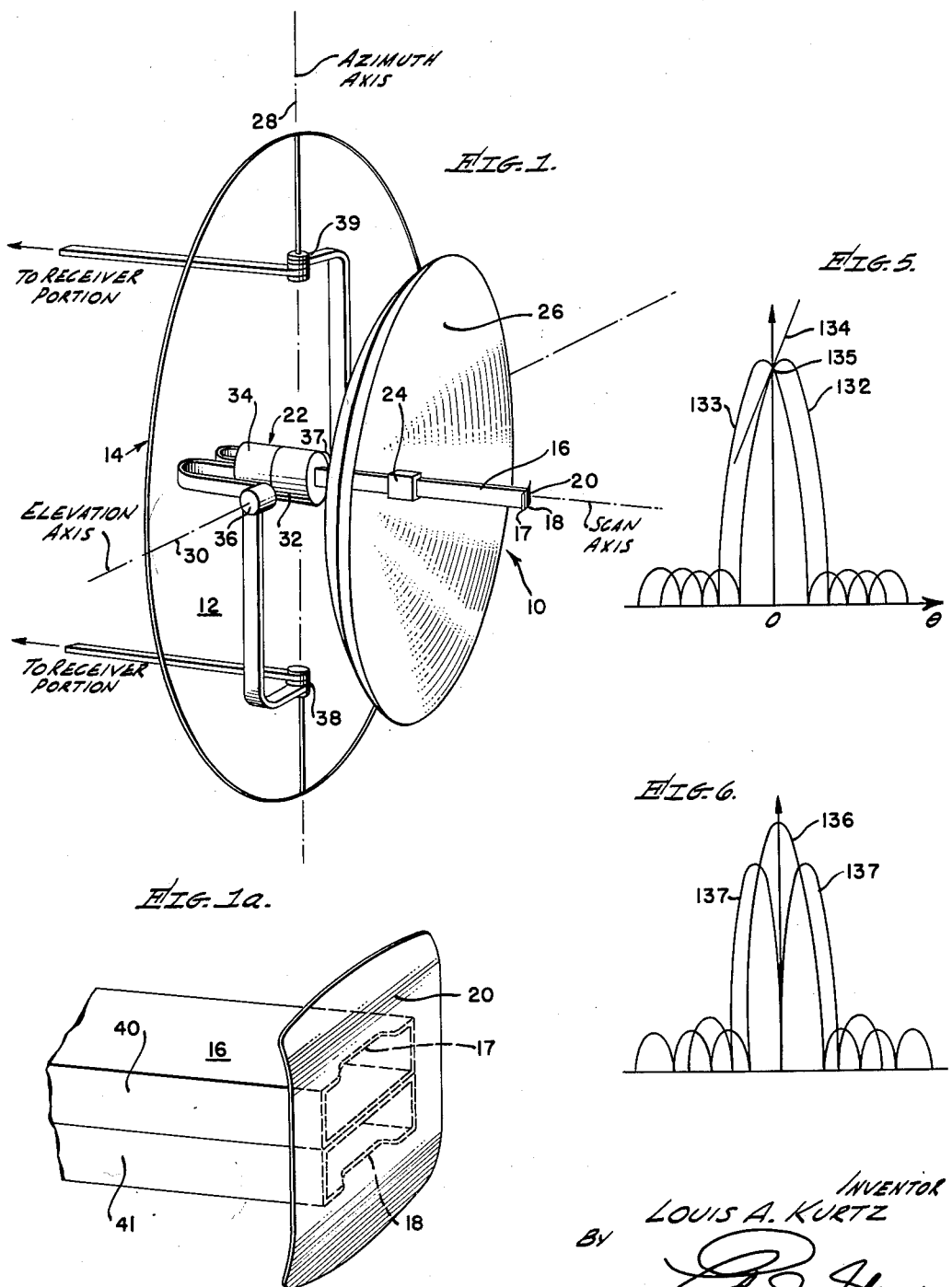
INVENTOR
LOUIS A. KURTZ
BY
ATTORNEY.

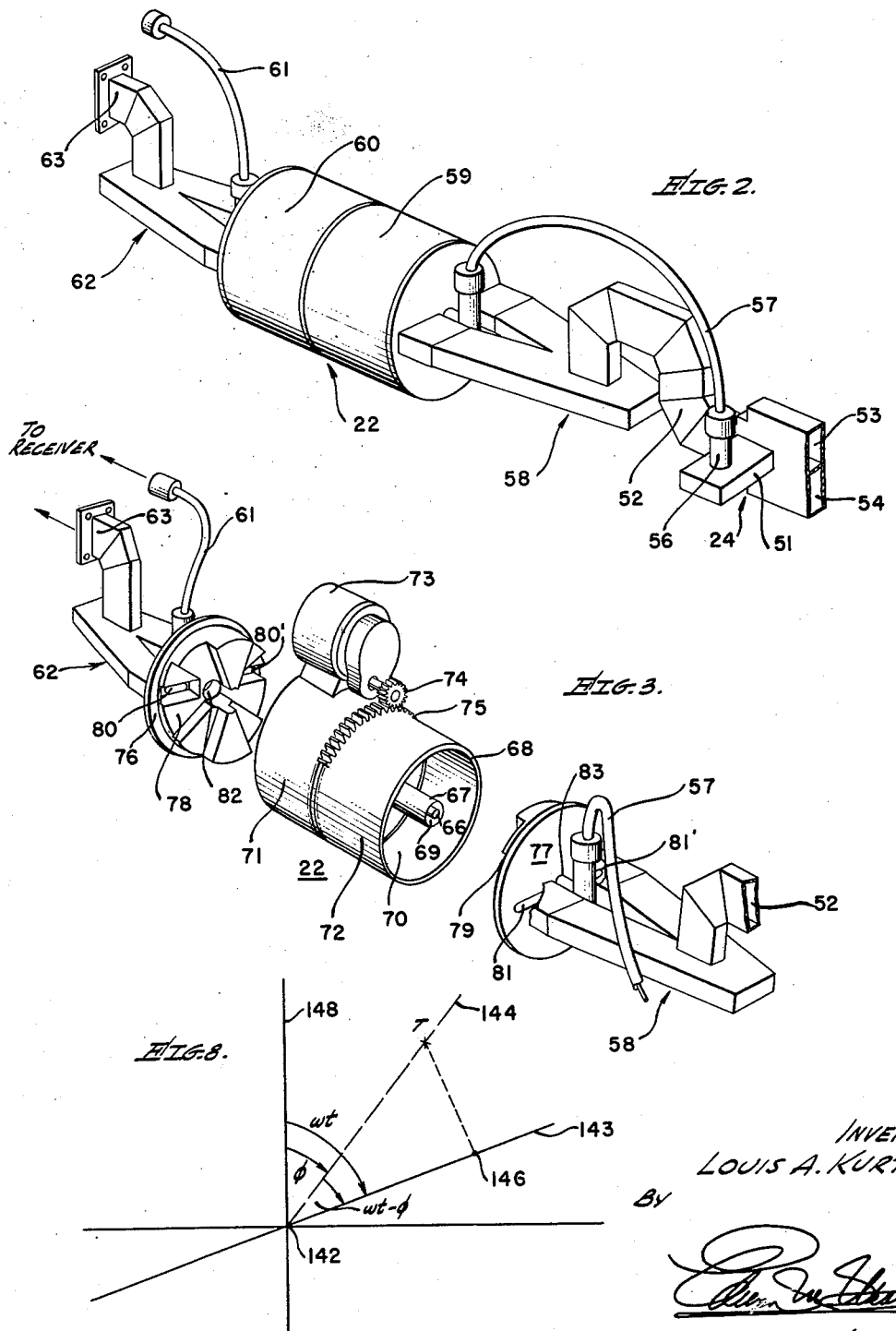

March 20, 1962 L. A. KURTZ 3,026,513
DUAL BEAM TRACKING SYSTEM
Filed April 24, 1956
3 Sheets-Sheet 3
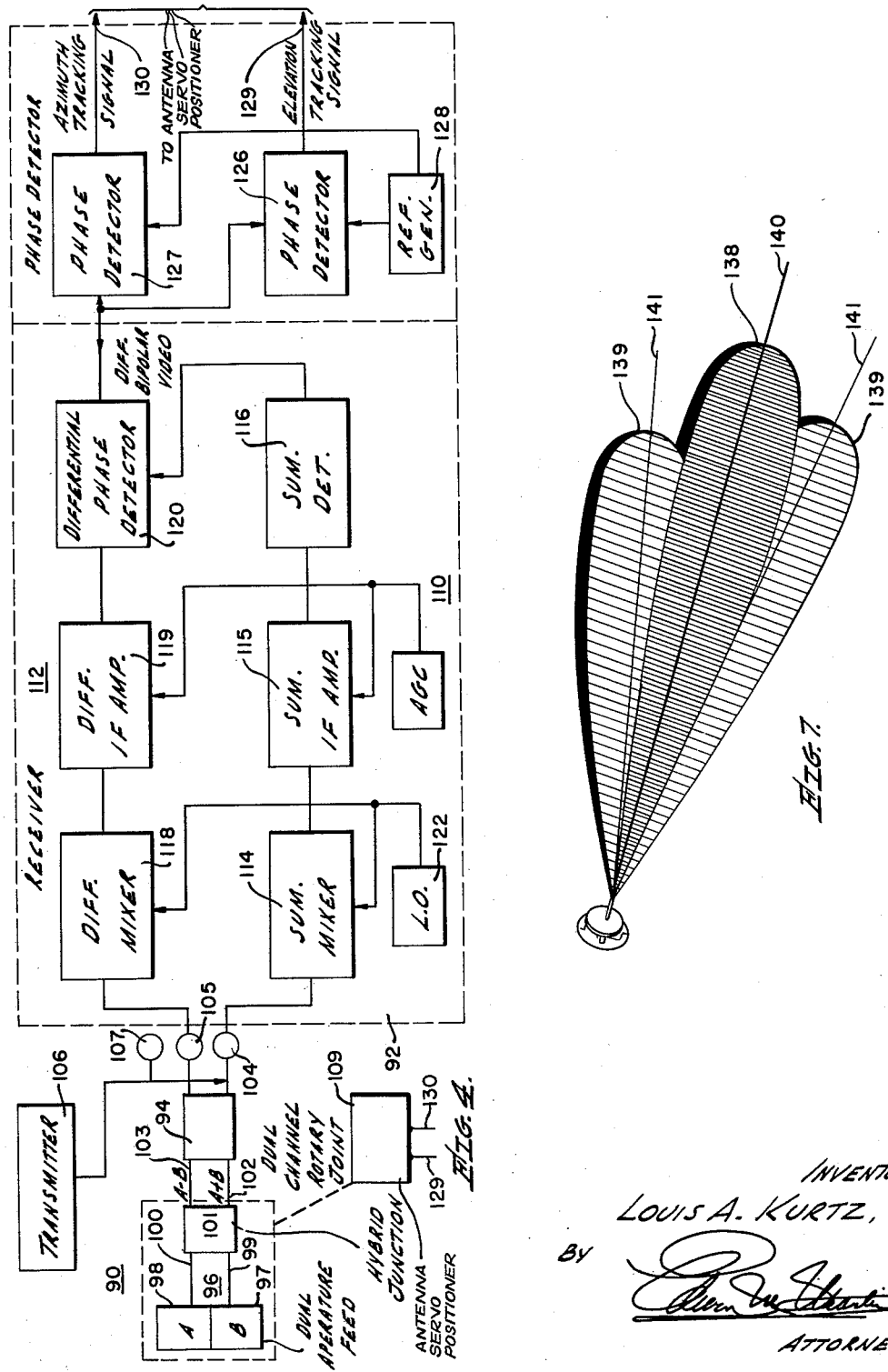
INVENTOR.
LOUIS A. KURTZ,
BY
ATTORNEY.

Header omitted 3,026,513
DUAL BEAM TRACKING SYSTEM
Louis A. Kurtz, Los Angeles, Calif., assignor to Hughes Aircraft Company, Culver City, Calif., a corporation of Delaware
Filed Apr. 24, 1956, Ser. No. 580,393
6 Claims. (Cl. 343—7.4)

This invention relates to a method of and a system for tracking aircraft and other targets and particularly to a wave energy tracking system combining certain features of conical scan and amplitude comparison monopulse techniques.

Conical scan angular tracking techniques essentially comprise the squinting of a wave energy beam, also called the main bang away from the scan axis and the rotating of the squinted beam about said scan axis. Conical scanning of the wave energy beam results in modulation of the reflected portion of the wave energy beam, also called the target echo signal at the conical scan frequency with an amplitude proportional to the angular distance between the line of sight and the scan axis. The target echo signal is then phase detected by comparing the phase of its modulation envelope with the phase of a reference signal envelope. The phase difference between the aforesaid signal envelopes is a measure of the angular position of the target in a plane perpendicular to the scan axis. The usual method of comparing the phase between the reference signal and the echo signal is to separate the reference signal into two quadrature components and compare the components with the echo signal. The result of such a comparison is the production of quadrature phase difference signals which provide to a predetermined scale the angular position of the target in terms of rectangular coordinates. The scan axis is maintained in coincidence with the line of sight by feeding the quadrature phase difference signals to a set of torquer means attached to the antenna. The torquer means are adapted to change the direction of the scan axis. One of the advantages of conical scan is that a single channel receiver may be employed to detect and track the target. Among the disadvantages of conical scan are the mechanical difficulties of producing the conically scanning beams requiring the rapid rotation of either an unsymmetric reflector dish or an unsymmetric feed structure. Compromise between good electrical and mechanical characteristics is necessary. Other disadvantages include: susceptibility to amplitude scintillations, difficulty of eliminating the bore-sight error, and sensitivity to certain kinds of counter measures.

The amplitude comparison monopulse tracking system makes use of a single transmitted wave energy beam and four stationary receiver elements to track the target and no motion of the transmitted beam is required. The four receiver elements results in the reception of four different target echo signals, the relative amplitudes of which are proportional to the angular position of the target in a plane perpendicular to the axis of symmetry of the four receiver elements. By comparing the relative amplitudes of the four echo signals with one another, two space quadrature difference signals may be developed which give the angular position of the target in terms of rectangular coordinates. The symmetry axis is maintained in coincidence with the line of sight in much the same manner as used in conical scan tracking techniques. Some of the advantages of the monopulse system are the complete absence of rotating members in the antenna portion of the system and the insensitivity of the system to amplitude scintillations. Among the disadvantages of the monopulse system are the requirement for three separate receivers and four separate sum-and-difference hybrid junctions, which make for considerable electrical complexity.

It is therefore an object of this invention to provide a wave energy tracking system incorporating the advantages of both conical scan and amplitude comparison monopulse techniques.

It is a further object of this invention to provide a wave energy tracking system which will derive position information from any linearly polarized received signal or any combination of such signals, and which has the inherent characteristics of cancelling the effects caused by bore slight error.

It is a still further object of this invention to provide a new method of tracking targets in space, incorporating the advantages inherent in the conical scan and amplitude comparison monopulse method.

In accordance with this invention the antenna of the wave energy tracking system radiates two identical beams of wave energy having a small angular displacement with respect to one another and illuminating a target. The axes of the angularly displaced beams define a plane called the simultaneous lobing plane. Midway between the angularly separated beams and lying in the same plane is the antenna axis. In the operation of the wave energy tracking system, the angularly separated beams and thereby the simultaneous lobing plane is rotated with a constant angular velocity about the antenna axis. The wave energy echo signals returned by the target are received by the antenna as two separate signals. These two signals are then added to one another to provide range information and subtracted from one another to provide information on the angular deviation of the line of sight from the antenna axis at the instant when the simultaneous lobing plane passes through the target. The signal obtained by subtracting is modulated in accordance with the angular velocity with which the simultaneous lobing plane rotates. The phase of the modulation envelope is compared with the phase of the reference signal envelope in the same manner used in conical scan techniques to derive information of the angular position of the simultaneous lobing plane when the latter passes through the target.

FIGS. 1 and 1A are perspective views of the antenna portion and gimbal system of the wave energy scanning system in accordance with this invention.

FIG. 2 is a perspective view of one embodiment of the combination of the dual channel rotary joint and the sum-and-difference hybrid junction and its related wave energy plumbing in accordance with this invention.

FIG. 3 is an exploded perspective view of the embodiment of the dual channel rotary joint shown in FIG. 2 including a motive means in accordance with this invention.

FIG. 4 is a schematic block diagram of the wave energy scanning system in accordance with this invention.

FIGS. 5, 6, 7, and 8 are explanatory diagrams depicting wave energy distribution to aid in the understanding of the operation of this invention.

Referring now to the drawings and more particularly to FIG. 1, there is shown an antenna portion 10 moveably mounted by a gimbal portion 12 supported in a stationary reference frame 14. The antenna portion 10 comprises a linearly polarized dual aperture feed 16 having two apertures 17 and 18 and a reflector cap or splash plate 20. One end of the dual aperture feed 16 is coupled to a dual channel rotary joint 22 by way of a sum-and-difference hybrid junction 24 so that the symmetric arms thereof form a continuation of the dual feed 16. Surrounding the dual aperture feed 16 and coaxial therewith, but not touching the same, and concavely facing the splash plate 20 is a parabolic reflector 26. The dual channel rotary joint 22 supported by the gimbal portion 12 permits limited angular motion about the azimuth axis 28 and the elevation axis 30. The reflector 26 is also supported by the gimbal portion 12 so that it remains coaxial with the feed 16.

In one embodiment of this invention the dual channel rotary joint 22 has a movable portion 32 and a stationary portion 34. The stationary portion 34 may be joined to one side of the elevation axis hinges 36 and 37, the other sides of which are joined to one side of the azimuth axis hinges 38 and 39. The other sides of the azimuth axis hinges 38 and 39 are then rigidly connected to the stationary reference frame 14. For mechanical coupling between the dual channel rotary joint 22 and the hinges 36 and 37 and again for mechanical coupling between the hinges 36 and 37 and the hinges 38 and 39, the dual set of plumbing which electrically couples the stationary side of the rotary joint 22 to the receiver portion of the radar scanning system may be employed as shown. The hinges then become an integral part of the electrical connections. These and other methods of interconnections are well known in the art. For example, the stationary side of the rotary joint may be electrically coupled to the receiver portion of the system by means of flexible microwave tubing and mechanically coupled to the reference frame by rotating hinges and mechanical members.

FIG. 1A is an enlarged view of the radiating portion of the dual aperture feed 16. Two waveguides 40 and 41, adapted to be excited by a source of electromagnetic energy, are placed back-to-back and form one end of the dual aperture feed 16. Slots 17 and 18 respectively are cut broadwise into the ends of the waveguides 40 and 41 forming the apertures. The splash plate 20 covers the open end of the waveguides 40 and 41, and by virtue of its shape will cause the energy radiated from the slots 17 and 18 to be directed against the parabolic reflector 26. The radiation portion of the dual aperture feed 16 shown in FIG. 1A is well known in the art as a Cutler type rear feed.

FIG. 2 shows in detail one embodiment of the combination of the hybrid junction 24 and the dual channel rotary joint 22 of this invention. The sum-and-difference hybrid junction 24 comprises a difference arm 51, a sum arm 52 and a pair of symmetric arms 53 and 54. The arms 53 and 54 are directly coupled to and may form the extension of a dual aperture feed. The proper aperture feed for the embodiment here shown would comprise two waveguides side-by-side instead of back-to-back as shown in FIG. 1A. The difference arm 51 may be provided with a pick-up probe 56 which provides a transition to a first coaxial waveguide 57. The coaxial waveguide 57 couples the difference arm 51 to the rotating portion 59 of the rotary joint 22. The sum arm 52 is also coupled to the rotatory portion 59 of the rotary joint 22 by means of a first $TE_{01}$ mode transducer 58. The mode transducer 58 may comprise a Y-junction of three identical waveguides in the H-plane, as well known to those skilled in the art, and is coupled to the sum arm 52 by means of a T-type E-plane junction as shown. The stationary portion 60 of the rotary joint 22 is coupled to the receiver portion of the radar scanning system by means of a second coaxial waveguide 61 and a second $TE_{01}$ mode transducer 62. The second mode transducer 62 is provided with an output arm 63 which forms a T-type E-plane junction. Upon transmission of wave energy through the rotary joint 22 the mode of the microwave energy in the output arm 63 is identical to the mode in the sum arm 52 and the mode in the first coaxial waveguide 57 is identical to the mode in the second coaxial waveguide 61.

FIG. 3 is an exploded view of the dual channel rotary joint 22 of FIG. 2 showing with more particularity one embodiment thereof. Essentially the rotary joint 22 is a dual channel coaxial waveguide having an inner conductor 66, a first outer conductor 67 and a second outer conductor 68. The combination of inner conductor 66 and the first outer conductor 67 together form an inner coaxial waveguide 69 and the combination of the first outer conductor 67 and the second outer conductor 68 together form an outer coaxial waveguide 70. The second outer conductor 68 is split into a stationary portion 71 and a rotatable portion 72 which are rotatably mounted with respect to one another. A motor 73 is mounted upon the stationary portion 71 of the second outer conductor 68 whose rotating shaft is provided with a sprocket gear 74 which engages a matched rim gear 75 mounted on the outside of and coaxial with the rotatable portion 72. The rotary joint 22 is also provided with two end plates 76 and 77, respectively, which provided a wave energy coupling unit between the antenna portion, the rotary joint 22 and the receiver portion of this invention. The end plate 76 is rigidly positioned to and forms a part of the stationary portion 71 and the end plate 77 is rigidly positioned to and forms part of the rotatable portion 72 of the second outer conductor 68. The end plates 76 and 77 are mirror images, each one being provided with a quarter wave step transformer containing three steps on the sides 78 and 79, respectively, and facing one another. Further each end plate 76 and 77 contains a pair of diametrically opposed radial slots 80, 80' and 81, 81', respectively, to provide wave energy coupling means to the mode transducers 62 and 58, and central openings 82, 83 to provide coupling means to the coaxial waveguides 57 and 61.

The antenna portion is coupled to the end plate 77 by joining the first coaxial waveguide 57 to the central opening 83 and the first mode transducer 58 to the slots 81, 81'. Similarly, the receiver portion is coupled to the end plate 76 by joining the second coaxial waveguide 61 to the central opening 82 and the second mode transducer 62 to the coupling slots 80, 80'.

The operation of the dual channel rotary joint 22 is best explained in terms of the modes in which the wave energy is transmitted through the inner and outer coaxial waveguides 69 and 70. The first coaxial waveguide 57 propagates the wave energy from the difference arm of the hybrid junction 24 in the TEM mode. Upon entering the central opening 83 and the inner coaxial waveguide 69, no change of mode is necessary and the wave energy is propagated through the central opening 82 to the second coaxial waveguide 61 without a mode transformation. The difference arm 51 only carries a small amount of energy and therefore any discontinuity in the inner coaxial waveguide due to rotatable mounting is negligible. Wave energy from the sum arm 52 of the hybrid junction 24 is transmitted to the first mode transducer 58 in the $TE_{01}$ mode and divided by the transducer 58 into two $TE_{01}$ modes which are 180 degrees out of phase with one another. These two modes then enter the quarter wave transformer of the end plate 77 through the coupling slots 81, 81', and thereby are combined and transformed into a single TEM mode in the outer coaxial waveguide 70. For this reason no current will flow along the direction of propagation of the wave energy and, consequently, the gap formed in the second outer conductor 68 of the rotary joint 22 by mounting the portions 71 and 72 rotatable with respect to one another, will not interfere with the propagation of wave energy. This is an important consideration since the sum channel carries much larger amounts of energy than the difference channel. The end plate 76 and the mode transducer 62 together transform the TEM mode in the outer coaxial waveguide 70 back to a single $TE_{01}$ mode in output arm 63 in a manner similar to the mode change discussed above.

FIG. 4 is a schematic block diagram of the wave energy scanning system of this invention comprising the antenna portion 90, the receiver portion 92 and the dual channel rotary joint 94 coupling the aforesaid portions 90 and 92 to one another. The dual aperture feed 96 having first and second radiation apertures 97 and 98 is electrically coupled to first and second symmetry arms 99 and 100 of the sum and difference hybrid junction 101. The sum arm 102 and the difference arm 103 of the hybrid junction 101 are coupled to the receiver portion 92 via the dual channel rotary joint 94 described in FIG. 3. Two TR tubes 104 and 105, respectively, provide for selective isolation between the antenna portion 90 and the receiver portion 92. A transmitter 106 which provides wave energy for the main bang is coupled to the sum arm 102 and selectively separated therefrom by a third TR tube 107.

The receiver portion 92 as a whole comprises essentially two separate receivers, a sum receiver 110 and a difference receiver 112. The sum receiver comprises a sum mixer 114 in series with sum IF amplifier 115 and a sum detector 116. The difference receiver 112 comprises a difference mixer 118 in series with a difference IF amplifier 119 and a difference phase detector 120. A local oscillator 122 is coupled to both the sum mixer 114 and the difference mixer 118. An AGC is coupled to both the sum IF amplifier 115 and the difference IF amplifier 119. The output portion of sum detector 116 providing the sum video is coupled to the input portion of the difference phase detector 120. The output portion of the difference phase detector 120 providing the difference bipolar video is then phase detected in a set phase detector by techniques well known to those skilled in the methods of conical scanning. The phase detector set comprises two-phase detectors 126 and 127 and a reference generator 128. The reference generator is coupled to the input portion of both the phase detectors 126 and 127 and supplies a reference signal whose frequency is identical to number of revolutions per second of the simultaneous lobing plane. The phase of the reference signals supplied to the phase detectors is in quadrature phase relation. Phase detection is accomplished by comparing the phase of the bipolar video signal with the phase of the two quadrature reference signals.

The output portion of phase detector 126 may provide the elevation tracking signal 129 and the output portion of phase detector 127 may supply the azimuth tracking signal 130. The tracking signals 129 and 130 may then be applied to a feedback system, such as commonly used in conical scan, to keep the reflector axis in coincidence with the line of sight. The feedback systems which may be employed with this invention will be apparent to those skilled in the art. For example an antenna servo positioner 109 may be coupled to the dual channel rotary joint 94 to control the mechanical movement of the dual channel rotary joint 94 and the antenna 90 in general. The antenna servo positioner 109 is responsive to the respective tracking signals 129 and 130.

FIG. 5 is a radiation pattern diagram of the separate radiation beam envelopes 132 and 133 from the separate apertures 97 and 98 of the dual aperture feed 96 shown in FIG. 4 and the ever present side lobes. The abscissa of the pattern diagram represents the angular displacement $\theta$ which any line from the focus of the reflector to any point on the beam envelope makes with the reflector axis and the ordinate represents the beam envelope power in decibels. The plane of the paper is the simultaneous lobing plane in which the axes of the separate beams lie. The beams 132 and 133 may be designated as the A and B beams, respectively, which letters will hereafter be used as a subscript to designate and distinguish between the separate contributions from the separate aperture 97 and 98. For small values of $\theta$, the shape of the individual beam envelopes and the electric field intensity corresponding to the envelopes may be approximated by the straight line segment 134 having slopes equal to $$\pm \frac{m}{2}$$

volts per meter per degree. The crossover point 135 of the two beams 132 and 133 may be chosen so that the corresponding electric field intensity along the reflector axis, i.e. for $\theta=0$, due to each seperate beam envelope is $L/2$ volts per meter per degree.

FIG. 6 is an effective composite radiation pattern diagram of the combined radiation beam envelopes 132 and 133 of FIG. 5 as said radiation pattern appears at the sum arm 102 and difference arm 103 of the sum-and-difference hybrid junction 101 of FIG. 4. The composite radiation pattern diagram shows the sum envelope 136 and the difference envelope 137 of the composite beam envelope on the same coordinate system as employed in FIG. 5.

For small values of the angular displacement $\theta$, the following equations may approximate these respective envelopes $$\left. \begin{array}{l} E_A + E_B = L \\ E_A - E_B = M \end{array} \right\} \quad (1)$$

where $E_A$ and $E_B$ are the electric field intensities respectively which are intercepted along the line of sight and received by the respective apertures of the dual channel feed.

Similarly, the voltages developed in the receiver portion which correspond to these field intensities may be written as $$\left. \begin{array}{l} V_A + V_B = KL \\ V_A - V_B = KM\theta \end{array} \right\} \quad (2)$$

where $K$ is a transfer constant.

FIG. 7 is a polar diagram of the effective composite radiation pattern of FIG. 6. It illustrates the sum envelope 138 and the difference envelopes 139 and the geometric relationships of the radiation pattern. The axis 140 of the sum beam 138 is the reflector axis and also the scan axis. During rotation of the dual aperture feed, the two difference envelopes 139 rotate about the scan axis. The axis 141 of the difference beam 139 lie in and determine the simultaneous lobing plane.

FIG. 8 is an illustrative diagram to aid in the explanation of the operation of this invention. The plane of paper is taken as perpendicular to the scan axis which therefore appears as a point 142. The line 143 represents the simultaneous lobing plane which is defined as a plane containing the scan axis and passing through the axes of the A and B beams. The line 144 is a projection of the target plane which is defined as a plane containing the scan axis and passing through the target T located in space. The projection of the target onto the simultaneous lobing plane 143 is the point 146. Line 148 is the projection of a reference plane which is defined as any stationary plane containing the reflector axis. The angle between the reference plane 148 and the target plane 144 is $\phi$. The simultaneous lobing plane 143 is rotated about the scan axis with an angular velocity $w$ so that the angle between the target plane 144 and the simultaneous lobing plane 143 is, at any time $t$, equal to $(wt-\phi)$. The point 146, which is the projection of the target T upon the simultaneous lobing plane 143 moves along the simultaneous lobing plane 143 with a motion described by the expression $\cos(wt-\phi)$.

The operation of this invention will become clearer by referring to FIG. 4. The transmitter 106 supplies the main bang in the form of pulsed wave energy which is transmitted to the sum-arm 102 of the hybrid junction 101 via the sum channel of the dual channel rotary joint 94. During the time of transmission of the main bang pulse, the TR tubes 104, 105 and 107 are energized. The effect of energizing the TR tubes effectively isolates the receiver portion 92 from the antenna portion 90, and at the same time couples the transmitter 106 to the antenna portion 90. The main bang pulse divides equally into two separate in-phase components by virtue of the inherent characteristic of the hybrid junction 101 and is conveyed through the symmetric arms 99 and 100 to the two separate apertures 97 and 98 of the linearly polarized dual aperture feed 96. After radiation from the feed, against the reflector and reflection therefrom into space, the main bang comprises two simultaneous lobing beams of equal magnitude and in-phase with each other of linearly polarized pulsed wave energy and is used to illuminate a target or other distant object. Scanning of the simultaneous lobing beams is brought about by rotating the antenna portion 90 about the reflector axis with an angular velocity $\omega$. The reflector axis is also the scan axis of the system.

The target or other distant object will give rise to an echo by reflecting part of the main bang therefrom. For small angular derivations between the scan axis and the line of sight, the echo will contain information of the location of the object with respect to the scan axis.

According to the relationships of Equation 1, the echo signal appearing in the sum-arm 102 of the hybrid junction 101 in terms of the electric field strength E will be $E_A + E_B = L$ and therefore a constant. The echo signal appearing at the difference-arm 103 of the hybrid junction 101, in terms of electric field strength, will be $E_A - E_B = m\theta$, where $\theta$ is, as before, the angular displacement of the target when the target is located in the simultaneous lobing plane. If the simultaneous lobing plane rotates with an angular velocity $\omega$, the signal in the difference arm 103 will be modulated and may be expressed by the relation $E_A - E_B = M\theta \cos wt$. The sum signal $E_A + E_B$ and the difference signal $E_A - E_B$ then pass from the antenna portion 90 to the receiver portion 92 through the dual channel rotary joint 94. The TR tubes 104, 105 and 107 being in their unenergized state effectively isolate the antenna portion 90 from the transmitter 106 and simultaneously couple the antenna portion 90 to the receiver portion 92. In the receiver portion 92 the sum and difference signals are mixed in the two mixers 114 and 118 with the signal from the local oscillator 122 and amplified by the amplifiers 115 and 119 by a factor K. Detection takes place in the two detectors 116 and 120 so that the sum and difference signals at the output of the respective detectors 116 and 120 may now be represented by $$\text{Sum signal} = KL$$
$$\text{Difference signal} = KM\theta \cos wt \quad (3)$$

The difference phase detector 120 has besides detecting a second function, namely to determine whether the angular displacement $\theta$ is positive or negative. For this reason the detector 120 computes the quotient $$\frac{Km\theta \cos (wt)}{KL} \quad (4)$$

It must be remembered that the sum signal as well as the difference signals are really phasors having magnitude and phase and therefore the quotients of the above equation will give a value corresponding to the relative phase of the two signals.

The output of the difference phase detector 120 is a difference bipolar video signal whose amplitude is proportional to $\theta$, and whose modulation envelope phase is proportional to $\phi$. Instead of resolving the output into $\theta$ and $\phi$, it is usually preferred to resolve into quadrature components. Consequently, the bipolar video signal is resolved into quadrative components by subjecting the signal to a first and a second phase detector 126 and 127 upon which is also impressed the reference signal from the reference generator 128. Phase detector 127 receives a signal proportional to sin $wt$ and phase detector 126 receives a signal proportional to cos $wt$. In other words, the detectors 126 and 127 compare the bipolar video signal from the difference phase detector with reference signals having the same frequency as the angular velocity of the antenna portion 90 and which are in phase quadrature with one another. The phase of the reference signal is zero when the target plane coincides with the reference plane 148 of FIG. 8. If there is an angle $\phi$ between the planes, the reference signals are delayed or advanced accordingly, as shown in FIG. 8.

The output of the phase detector 126 is the elevation tracking signal 129 and the output of the phase detector 127 is the azimuth tracking signal 130. The scanning signals may be used directly for visual observation as well as with a conventional feedback system utilizing torque generated by gyros to position the gimbal system of FIG. 1 to align the scan axis with the line of sight.

There has been described a new and novel kind of wave energy tracking system whereby certain features of conical scan and amplitude comparison monopulse techniques are combined. The coordinates of a target located in space may be determined by utilizing two beams which define a simultaneous lobing plane and rotating these two beams and thereby the lobing plane at a substantially constant angular velocity. The apparatus hereabove described lends itself particularly well to practicing the objects of tracking targets in space.

What is claimed is:

1. In a system for tracking an object, the combination of means adapted to illuminate a target volume with two beams of electromagnetic energy, the axes of said beams being angularly displaced from each other and defining a simultaneous lobing plane, means for causing said beams to move so that said plane will rotate about a scan axis which is disposed in said plane and bisects the angle between said axes, means for receiving energy from said beams reflected from any targets present in said volume in proportion to the intensity thereof thereby to provide a pair of signals, means including a sum and difference hybrid junction for adding and subtracting said pair of signals thereby to provide a sum signal and a difference signal, and means responsive to said sum and difference signals for generating azimuth and elevation tracking signals.

2. In a system for tracking an object, the combination of antenna means including a dual feed apparatus for illuminating a target volume with two beams of electromagnetic energy, the axes of said beams being angularly displaced from each other and defining a simultaneous lobing plane, means for rotating said dual feed apparatus thereby to rotate said beams about a scan axis disposed in said plane and bisecting the angle between said axes of said beams, means for receiving energy from said beams reflected from any targets present in said volume in proportion to the intensity thereof thereby to provide a pair of signals, means including a sum and difference hybrid junction for adding and subtracting said pair of signals thereby to provide a sum signal and a difference signal, and means responsive to said sum and difference signals for generating azimuth and elevation tracking signals.

3. A system for tracking an object by wave energy reflected therefrom, said system comprising: antenna means for illuminating said object with two simultaneous lobing beams of pulsed linearly polarized electromagnetic energy and for receiving wave energy reflected from said object, the axes of said beams being separated by a predetermined angle, the bisector of said predetermined angle defining a scan axis; receiver means operatively interconnected with said antenna means and having two channels for selectively receiving said reflected wave energy from said antenna means and for generating a pair of signals representative of the position of said target; and means for rotating said antenna means about said scan axis at a substantially constant angular velocity, the direction of polarization of said linearly polarized energy remaining constant with respect to radial lines from said scan axis to the respective centers of said rotating beams.

4. A system for tracking an object by wave energy reflected therefrom, said system comprising: antenna means for illuminating said object with electromagnetic energy, said antenna means having at least a portion thereof rotatably mounted and adapted to radiate two outwardly divergent beams of said energy, the axes of said beams being separated by a predetermined small angle and defining a simultaneous lobing plane, the bisector of said predetermined small angle defining a scan axis located in said plane, rotating means coupled to said portion of said antenna means for rotating said portion to rotate said antenna portion about said scan axis at a substantially constant angular velocity; a receiver means having two receiver channels operatively interconnected with said portion of said antenna means so as to be responsive to the wave energy in said beams reflected from said object so as to generate tracking signals, and means coupled to said antenna portion and responsive to said tracking signals to reorient said antenna portion continually to provide coincidence between the scan axis and said target.

5. A system for tracking an object by wave energy reflected therefrom, said system comprising in combination: antenna means for illuminating said object with linearly polarized electromagnetic energy, said antenna means having a portion thereof rotatably mounted and adapted to radiate a pair of outwardly divergent beams of pulsed linearly polarized wave energy, the axes of said beams being separated from each other by a predetermined angle and defining a simultaneous lobing plane, the bisector of said predetermined angle defining a scan axis which is coincident with the axis of rotation of said portion of antenna means, means for rotating said portion about said scan axis at a substantially constant angular velocity, the direction of polarization of said linearly polarized wave energy remaining constant with respect to a radial line from said scan axis to either one of said rotating beam axes, receiver means operatively interconnected with said portion of said antenna means and responsive to the energy reflected from said object so as to generate tracking signals representative of the location of said object with respect to said scan axis, and means interconnected with said antenna means and said receiver means and being responsive to said tracking signals to keep said antenna means oriented so that said scan axis will intersect said object.

6. In a device of the class described, the combination of antenna means adapted to illuminate a target area with electromagnetic energy, said antenna means having at least a portion thereof adapted to radiate said energy in the form of two divergent beams, the axes of said beams being angularly displaced from each other so as to form a predetermined angle therebetween that is bisected by a scan axis, said axes being arranged to define a simultaneous lobing plane, and means operatively interconnected with said portion of said antenna for causing said beams to move so that said simultaneous lobing plane will rotate about said scan axis.

References Cited in the file of this patent

UNITED STATES PATENTS

| | | |
|---|---|---|
| 2,616,078 | Fyler | Oct. 28, 1952 |
| 2,636,126 | Errington | Apr. 21, 1953 |
| 2,682,656 | Phillips | June 29, 1954 |
| 2,687,520 | Fox et al. | Aug. 24, 1954 |
| 2,759,154 | Smith et al. | Aug. 14, 1956 |

FOREIGN PATENTS

| | | |
|---|---|---|
| 610,664 | Great Britain | Oct. 19, 1948 |

UNITED STATES PATENT OFFICE
CERTIFICATE OF CORRECTION

Patent No. 3,026,513                  March 20, 1962

Louis A. Kurtz

It is hereby certified that error appears in the above numbered patent requiring correction and that the said Letters Patent should read as corrected below.

Column 2, line 12, for "slight" read -- sight --; column 4, line 14, for "provided" read -- provide --; column 6, lines 16 to 18, the equation should appear as shown below instead of as in the patent:

$$\left. \begin{array}{l} E_A + E_B = L \\ E_A - E_B = M\theta \end{array} \right\}$$

Signed and sealed this 28th day of August 1962.

(SEAL)
Attest:

ESTON G. JOHNSON                      DAVID L. LADD
Attesting Officer                 Commissioner of Patents